United States Patent [19]

Boury

[11] Patent Number: 5,217,763
[45] Date of Patent: Jun. 8, 1993

[54] SIMULATED THREE-DIMENSIONAL NIGHT SKY PATTERN KIT AND METHOD OF USING SAME

[76] Inventor: Bradley J. Boury, 20430 Kemp, Mt. Clemens, Mich. 48043

[21] Appl. No.: 651,725

[22] Filed: Feb. 7, 1991

[51] Int. Cl.$^5$ .............................. G09B 27/04
[52] U.S. Cl. .................. 428/11; 206/575; 206/579; 428/690; 434/284
[58] Field of Search ............ 206/575, 579; 428/11, 428/40, 690; 434/284, 285, 289; 40/583; D19/59, 61, 62

[56] References Cited

U.S. PATENT DOCUMENTS

| | | | |
|---|---|---|---|
| 2,809,833 | 10/1987 | Slade | 272/8 |
| 3,261,126 | 7/1966 | Marks | 428/40 X |
| 3,445,551 | 5/1969 | Griffin | 428/11 X |
| 4,489,111 | 12/1984 | Woodrum | 206/575 X |
| 4,726,773 | 2/1988 | Lazar | 434/289 |
| 4,781,647 | 11/1988 | Doane, Jr. | 446/219 |
| 4,884,990 | 12/1989 | Lovik | 446/220 |
| 4,928,212 | 5/1990 | Benavides | 428/690 X |
| 5,084,309 | 1/1992 | Smith et al. | 428/690 X |

FOREIGN PATENT DOCUMENTS 1011892 12/1965 United Kingdom .................. 428/11

OTHER PUBLICATIONS

"Plastics that Glow in the Dark", *Modern Plastics*, Oct. 1948, pp. 88–91.

*Primary Examiner*—Henry F. Epstein
*Attorney, Agent, or Firm*—Basile and Hanlon

[57] ABSTRACT

A simulated three-dimensional night sky kit for a substantially flat surface includes a plurality of groups of discrete star-shaped bodies. Each of the bodies is a rigid, planar member formed of a plastic material exhibiting phosphorescent properties. The number of bodies forming each of the plurality of groups of bodies and the tip-to-tip dimensions of the bodies of each group of bodies varies substantially between the groups of bodies to provide a simulated three-dimensional night sky when the groups of bodies are mounted in a random distribution on a substantially flat surface. Each body includes a mounting arrangement formed of a resilient foam pad, a permanent adhesive layer bonding the pad to the body, and a releasable adhesive layer on an opposite surface of the pad to releasably mount the body and the pad to a surface.

15 Claims, 2 Drawing Sheets

SIMULATED THREE-DIMENSIONAL NIGHT SKY PATTERN KIT AND METHOD OF USING SAME

BACKGROUND OF THE INVENTION

1. Field of the Invention

The present invention relates, in general, to decoration devices and, more specifically, to decoration devices for creating simulated three-dimensional patterns on a flat surface.

2. State of the Art

Kits containing a plurality of star-shaped bodies have been devised to create a simulated night sky on a flat surface, such as the ceiling of a room. Such star-shaped bodies or "stars" are formed of various thin sheet-like materials, such as paper, vinyl, etc., and coated with a layer of phosphorescent pigments so as to phosphoresce or glow in the dark after exposure to light. The star-shaped bodies are also provided with a permanent adhesive on a back surface to enable the bodies to be securely mounted on a ceiling or other flat surface.

In use, such star-shaped bodies or simulated stars are attached in a random distribution or in predetermined patterns corresponding to constellations, for example, on a ceiling. The bodies phosphoresce or glow in the dark after having been previously exposed to light and the room lights are extinguished or light is blocked off from the room. However, while this distribution of simulated stars somewhat resembles a night sky filled with stars, it lacks the three-dimensional effect of a real night sky. This is due primarily to the use of star-shaped bodies which are the same or substantially the same in size and which have a relatively small size, typically one inch or less.

Furthermore, some of such previously devised star-shaped bodies employ a gum adhesive which is moistened to apply the bodies to a ceiling or other wall surface. This securely bonds the bodies to the flat surface; but makes removal of the bodies extremely difficult. Such removal commonly results in a partial removal of or damage to the wall or ceiling surface on which the star-shaped bodies were mounted. This is typically the case when the star-shaped bodies are mounted on a plaster drywall surface typically found in houses. Star-shaped bodies using a pressure sensitive adhesive can be easily removed from a wall surface within a short time, i.e., several hours, after attachment. However, over time, the pressure sensitive adhesive forms a permanent bond to the ceiling or wall surface thereby making removal of the star-shaped bodies without damage to the wall surface extremely difficult if not impossible.

Further, such permanent or pressure sensitive adhesives are applied across the entire back surface of each star-shaped body to provide a secure attachment to a ceiling or wall and to prevent curling of the edges of the thin sheet material used to form such bodies. This places a large amount of adhesive surface in contact with the ceiling or wall which further prohibits the easy removal of the star-shaped bodies without damage to the ceiling or wall.

Finally, the use of such permanent adhesives and the thinness of the sheet material used to form such previously devised star-shaped bodies enables such star-shaped bodies to be used only once. The removal and reuse of such previously devised star-shaped bodies has not been possible.

Thus, it would be desirable to provide a kit which provides a simulated three-dimensional night sky when applied to a flat surface, such as the ceiling of a room. It would also be desirable to provide such a simulated three-dimensional night sky pattern kit in which the individual components of the kit, i.e., star-shaped bodies, are easy to apply to a flat surface, such as the ceiling of a room. It would be desirable to provide a simulated three-dimensional night sky pattern kit in which the individual components are easily removed from a wall surface without marking or otherwise damaging such surface. Finally, it would be desirable to provide a simulated three-dimensional night sky pattern kit in which the individual components are reusable after a first application.

SUMMARY OF THE INVENTION

The present invention is a kit for simulating a three-dimensional night sky on a flat surface, such as the ceiling of a room.

The kit comprises a plurality of at least three distinct groups of different size star-shaped bodies. The bodies in each of the three groups are identical in shape to each other, with the bodies in different groups differing from those in other groups only in size. The bodies in each group have front and back surfaces and interconnecting side edges. The bodies are formed of a rigid phosphorescent plastic material which phosphoresces or glows after exposure to light. A mounting means is mounted on the back surface of each body for removably attaching the body to a flat surface.

In a preferred embodiment, each of the bodies is formed of a molded, rigid, phosphorescent pigmented plastic. Further, the side edges of each body are bevelled inward from the back surface to the front surface to provide a finished edge to each body for a smoother, flatter appearance.

The mounting means preferably comprises a resilient foam pad, a permanent adhesive layer bonding the foam pad to the back surface of each body, and a releasable adhesive layer on the opposite side of the foam pad for removably attaching the pad and the body to a ceiling or other surface.

The number of bodies in each of the three exemplary groups of bodies forming the kit of the present invention are provided in different quantities. This, in combination with the substantial difference in sizes of the three groups of bodies, provides a simulated three-dimensional night sky when the bodies are randomly distributed and attached to a flat surface, such as the ceiling of a room. Each of the bodies phosphoresces when light in the room is extinguished or blocked off.

The kit of the present invention uniquely provides a simulated three-dimensional night sky when the components of the kit are applied to a flat surface, such as the ceiling of a room. The significant difference in size between the bodies in each separate group of bodies provides a more realistic, simulated, three-dimensional night sky than prior art star kits in which the stars are substantially the same size.

The individual star-shaped bodies are easy to apply to a flat surface, such as a ceiling of a room. More importantly, the bodies are easily removed from the flat surface without tearing or otherwise damaging the flat surface during such removal. This is due to the unique mounting means employed with each star-shaped body. The resilient foam pad compensates for any surface irregularities in the ceiling or wall surface to provide complete permanent adhesive contact across the entire surface of the pad. Further, the use of a releasable adhesive provides several significant advantages for the present invention which have not been provided with prior art star kits. The releasable adhesive enables the star-shaped bodies to be easily removed at any time from the ceiling or wall surface without damage to such surface. The bodies, thus, can be repositioned on the ceiling at any time or completely removed and used at a different location. The bodies can also be removed for cleaning and easily reapplied to the same or another surface by merely employing a new mounting means.

BRIEF DESCRIPTION OF THE DRAWING

The various features, advantages and other uses of the present invention will become more apparent by referring to the following detailed description and drawings in which.

DESCRIPTION OF THE PREFERRED EMBODIMENTS

The present invention is a kit which creates a simulated three-dimensional night sky when the elements of the kit are applied to a flat surface, such as the ceiling of a room.

The kit of the present invention includes a plurality of distinct groups of star-shaped bodies. Preferably, first, second and third groups of star-shaped bodies are used to form the kit of the present invention. It will be understood that other numbers of distinct groups of star-shaped bodies may also be employed.

The star-shaped bodies in each of the first, second and third groups are identical in shape to the bodies in the other groups; but differ from the bodies in the other groups in size.

Since each of the bodies in the first, second and third groups of bodies are identical, except for size, the specific construction of only one of the bodies will be described in detail hereafter. It will be understood that this description applies to all of the bodies in each of the first, second and third groups of bodies.

Figure 1:
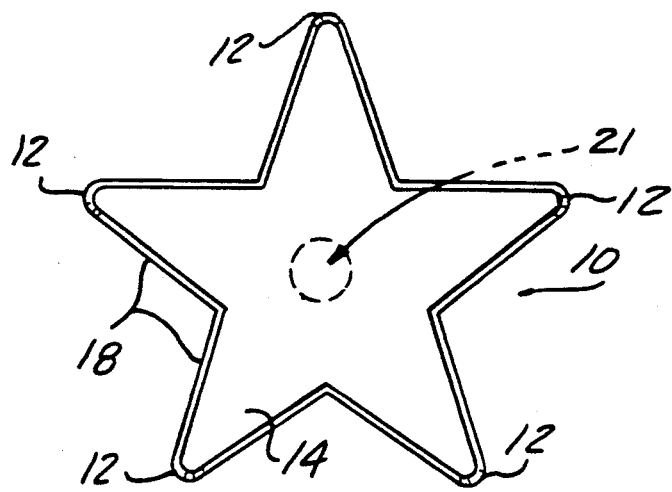
FIG. 1 is a plan view of one type of star-shaped body of the kit of the present invention.
Figure 2:
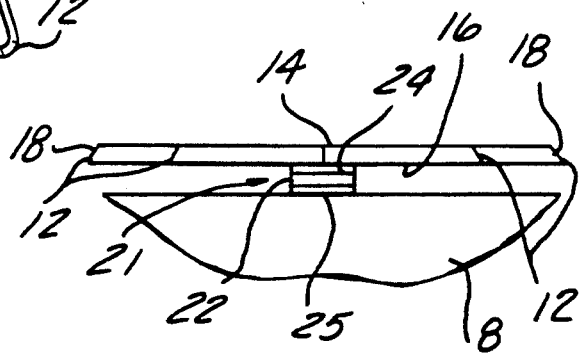
FIG. 2 is a side elevational view of the body shown in FIG. 1.

As shown in FIGS. 1 and 2, the star-shaped body 10 has a planar star shape. The star-shaped body 10 is provided with a plurality of tips or points 12. Five tips 12 are shown in a preferred embodiment of the body 10. It will be understood that the star-shaped body 10 may be provided with any other number of tips or points 12, such as six, seven, etc.

The body 10 is formed of a thin, rigid plastic material. By way of example only, the body 10 has a thickness of 1/16 of an inch and a predetermined tip 12 to tip 12 dimension, as described hereafter.

The body 10 has a front surface 14, a back surface 16 and a side edge 18 which interconnects the front and back surfaces 14 and 16, respectively. In a preferred embodiment, the side edge 18 of the body 10 is bevelled or inclined inward at an acute angle from the back surface 16 to the front surface 14. This inclined surface provides a finished edge to the body 10 and presents a smooth and flat appearance for the body 10 when it is mounted on a ceiling or other surface.

The body 10 is formed of any suitable plastic material. Preferably, the body 10 is formed of a moldable plastic material; although other plastic materials which can be cut or formed to the desired shape may also be employed. In a preferred embodiment, the body 10 is formed of a material which exhibits luminescent or phosphorescent properties. This enables the body 10 to luminesce or phosphoresce after exposure to natural or artificial light.

The body 10 is preferably formed of a plastic material which is clear or light colored, i.e., white. Various, conventional phosphorescent pigments are molded in various proportions into the plastic during the formation of the body 10. Such pigments, as is well known, radiate lumination when placed in dark or low light level areas for a certain period of time depending upon the nature and quantity of the pigments in the body 10 and the prior amount of exposure to natural or artificial light.

In a preferred embodiment, the body 10 is formed of an opaque, high impact styrene plastic. Other plastic materials, such as ABS, PVC, polypropylene, etc., can also be employed; however the amount of lumination radiated from such materials may be less than that of the preferred material.

The body 10 may also be formed of other materials, such as wood, metal, etc. When using these materials and even the aforementioned plastics, phosphorescent properties can be provided by painting the body 10 with a phosphorescent pigmented paint or by applying a film of plastic, paper, etc., containing phosphorescent pigments over the front surface 14 of the body 10.

Mounting means 21 is provided for removably attaching the body 10 to a flat surface 8, such as the ceiling of a room. In a preferred embodiment, the mounting means 21 comprises a resilient foam pad or layer 22, a permanent adhesive layer 24 which bonds the foam pad 22 to the back surface 16 of the body 10, and a releasable adhesive layer 25 disposed on the opposite surface of the foam pad 22 to removably mount the body 10 to a surface.

In a preferred embodiment, the resilient foam pad 22 is formed of a suitable foam material, such as a cross-linked polyurethane, which is formulated to have resilient characteristics. The pad 22 may have any shape, such as circular, square, rectangular, etc. A three-eighths-inch diameter circular pad 22 is shown in FIG. 1 by way of example only. The pad 22 is significantly smaller than the surface of the body 10. However, through the use of the adhesive layers described hereafter, a sufficient bond is created to securely and permanently bond the pad 22 to the body 10 and to securely, but releasably, attach the pad 22 to a ceiling 8 or other surface.

The resilient foam pad 22 conforms to any irregularities, such as cracks, bumps, holes, etc., in the surface 8 so as to provide a bonding surface which extends over the entire surface area of the pad 22.

The permanent adhesive layer 24 may be formed of any suitable adhesive which forms a permanent bond between two surfaces or objects. The releasable adhesive layer 25 can be any type of adhesive which provides a bond between two surfaces or objects; but which allows the two surfaces or objects to be separated under a light separation force. For example, the releasable adhesive layer 25 can be formed of an adhesive sold under the trade name "Light Tac".

Figure 5:
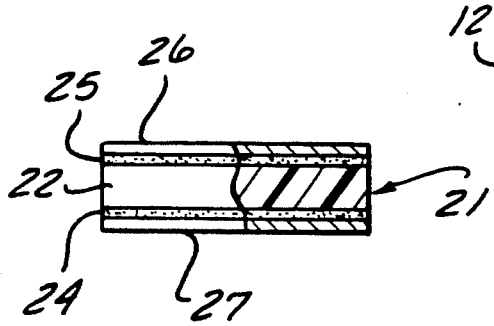
FIG. 5 is a partially cross-sectioned, side elevational view of the mounting means employed with each star-shaped body.

For protection during packaging and shipping and for ease of application to the body 10, a removable paper or other sheet material layer or backing 26, FIG. 5, is attached to and completely covers the exposed surface of the releasable adhesive layer 25 on the foam pad 22. The paper layer or backing 22 is removed prior to mounting the body 10 on a flat surface. The paper backing 22 may be sized to the shape and size of one foam pad 22 or be provided in an enlarged sheet for covering and grouping together a plurality of foam pads 22.

A second paper or plastic backing 27, as shown in FIG. 5, is removably applied over the permanent adhesive layer 24 prior to application of the foam pad 22 to the body 10. The second backing 27 is removed to expose the permanent adhesive layer 24.

Figure 3:
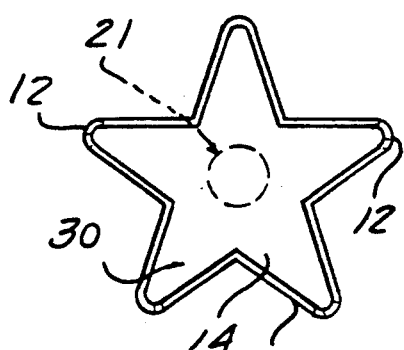
FIGS. 3 and 4 are plan views of other types of bodies employed in the kit of the present invention.

As noted above, the kit of the present invention is provided with first, second and third groups of bodies, with the bodies in each of the first, second and third groups differing in size from group to group. In a preferred embodiment, the first group of bodies comprises a plurality of identically shaped bodies 30, as shown in FIG. 3. By way of example only, the tip 12 to tip 12 dimension of each body 30 is 50 mm.

The second group of bodies contains a plurality of bodies 10 as shown in FIG. 1. Each of the bodies 10 has a tip-to-tip dimension of 80 mm. This dimension is by way of example only as other sizes may also be employed for each body 10. Preferably, however, the size of each body 10 is significantly larger than the size or tip-to-tip dimension of each body 30 as described hereafter.

Figure 4:
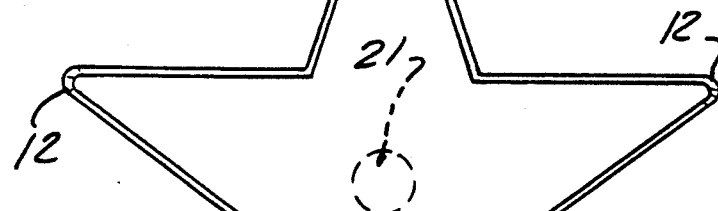

Finally, the third group includes a plurality of bodies, such as body 34 shown in FIG. 4. Each body 34 has a tip-to-tip dimension of 120 mm, for example. The dimension of each body 34 is significantly larger than the corresponding dimension of each body 10.

In a preferred embodiment, the bodies 10 forming the second group of bodies in the kit have a tip-to-tip dimension which is substantially 40% to 75% larger than the tip-to-tip dimension of the bodies 30 in the first group of bodies. Each of the bodies 34 of the third group of bodies has a tip-to-tip dimension which is substantially 40% to 75% larger than the tip-to-tip dimension of the bodies 10 of the second group of bodies. This size variation, which conforms to the dimensions described above, causes a three-dimensional effect when the bodies 10, 30 and 34 are randomly distributed and mounted on a ceiling 8.

Further, the bodies 30, 10 and 34 are provided in different quantities to form the first, second and third groups of bodies. By way of example only, the kit of the present invention contains thirty of the smaller bodies 30, twenty of the middle-sized bodies 10 and ten of the larger bodies 34. Of course, such quantities are presented by way of example only as other quantities of each of the bodies in each of first, second and third groups of bodies may also be employed in the present kit.

According to the method of using the kit of the present invention, the first step involves forming at least first, second and third discrete groups of star-shaped bodies. Each of the bodies in each of the first, second and third groups of bodies is formed of a rigid plastic having front and back surfaces 14 and 16 and interconnecting side edges 18. A mounting means 21 is mounted on the back surface of each of the bodies for removably attaching each of the bodies to a flat surface 8, such as the ceiling of a room.

The tip-to-tip dimension of the bodies 30 forming the first group of bodies is substantially less than the corresponding dimension of the bodies 10 forming the second group of bodies. Similarly, the tip-to-tip dimension of the bodies 10 in the second group of bodies is substantially less than the corresponding dimension of the bodies 34 forming the third group of bodies.

Each of the bodies is formed of a rigid plastic material exhibiting phosphorescent properties so as to phosphoresce after exposure to light.

Next, a larger quantity of the first group of bodies are provided than the number of bodies in the second group of bodies. Similarly, a larger quantity of second bodies are employed than the number of bodies in the third group of bodies.

Figure 6:
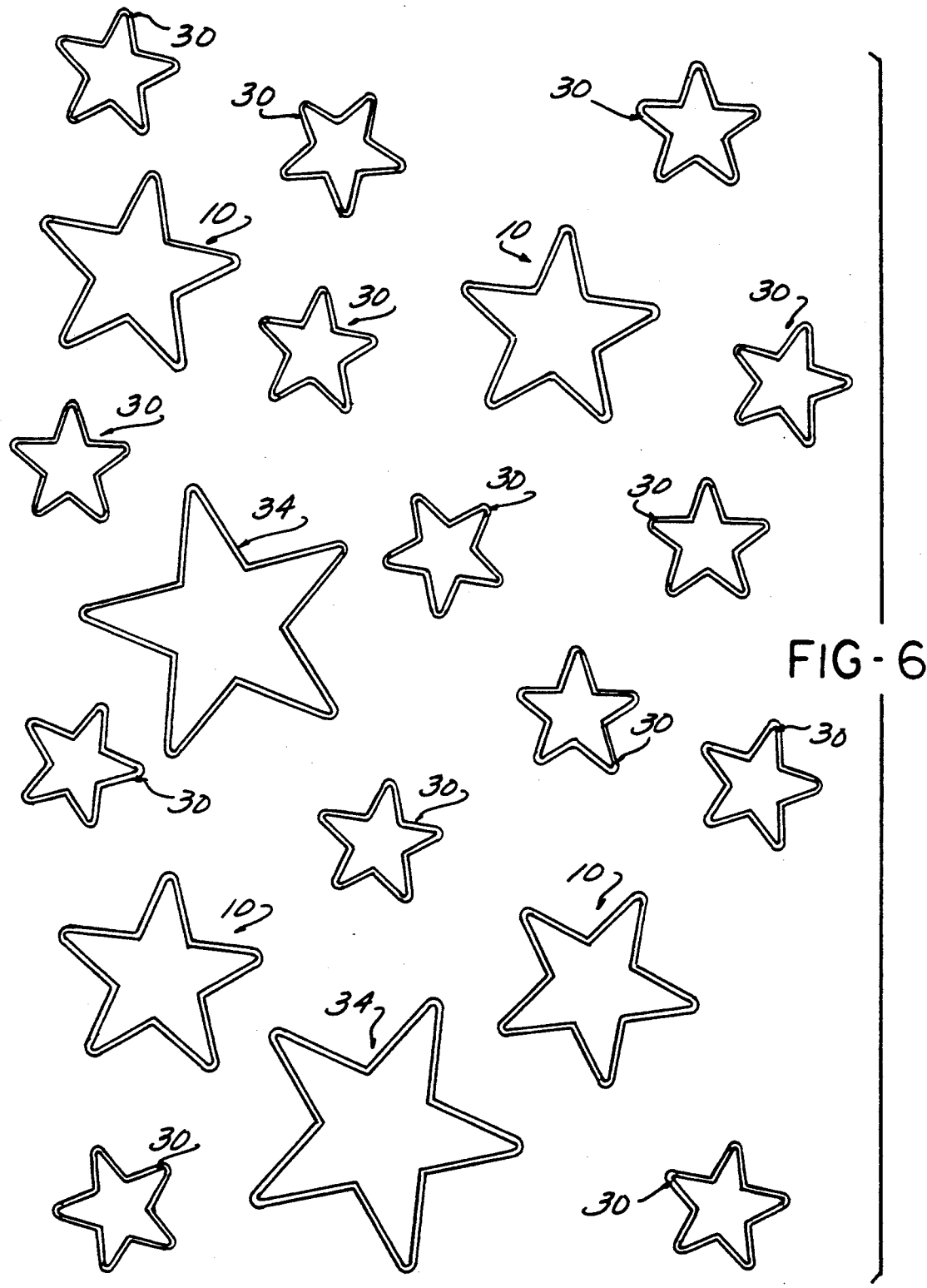
FIG. 6 is a pictorial representation of a random distribution of the bodies of three distinct groups of bodies of the kit of the present invention applied to a flat surface.

Finally, the method of the present invention entails the step of removably attaching the first, second and third groups of bodies in a random distribution to a flat surface 8 to create a simulated three-dimensional night sky on the flat surface 8, such as the ceiling of a room, as shown in FIG. 6.

In summary, there has been disclosed a unique kit for creating a simulated three-dimensional night sky on a flat surface, such as a ceiling of a room. The star-shaped bodies of the kit are easily attachable to the flat surface and, more importantly, are easily removable from such surface without damaging the surface during such removal. The star-shaped bodies are also reusable by merely employing a new mounting means on each body.

What is claimed is:

1. A star figure for a simulated three-dimensional night sky pattern kit comprising:
   a planar star-shaped body having front and back surfaces and interconnecting side edges;
   the body being formed of a rigid plastic material having phosphorescent properties after exposure to light; and
   adhesive mounting means, mounted on the back surface of the body, for removably attaching the body to a surface, the adhesive mounting means covering a small portion of the surface area of the body.

2. The star figure of claim 1 wherein the body is formed of a molded plastic material containing phosphorescent pigments.

3. The star figure of claim 1 wherein the mounting means comprises:
   a resilient foam pad;
   a permanent adhesive layer bonding the foam pad to the back surface of the body; and
   a releasable adhesive layer disposed on an opposite surface of the foam pad for releasably attaching the foam pad and the body to a surface.

4. A star figure for a simulated three-dimensional night sky pattern kit comprising:
   a planar star-shaped body having front and back surfaces and interconnecting side edges, the side edges being disposed at an acute angle with respect to the back surface of the body;
   the body being formed of a rigid plastic material having phosphorescent properties after exposure to light; and
   adhesive mounting means, mounted on the back surface of the body, for removably attaching the body to a surface, the adhesive mounting means covering a small portion of the surface area of the body.

5. A kit for creating a simulated three-dimensional night sky on a substantially flat surface comprising:

at least first, second and third groups of star-shaped bodies, each having a plurality of radially extending tips, the bodies in each of the first, second and third groups being identical in shape to the bodies in the other of the first, second and third groups, respectively, each of the bodies in the first, second and third groups differing in size from the bodies in the other of the first, second and third groups;

the bodies in each of the first, second and third groups having front and back surfaces and interconnecting side edges;

each of the bodies being formed of a rigid plastic material having phosphorescent properties after exposure to light; and adhesive mounting means, mounted on the back surface of each body, for removably attaching each body to a surface, the adhesive mounting means covering a small portion of the surface area of each body.

6. The kit of claim 5 wherein each of the bodies is formed of a molded plastic material containing phosphorescent pigments.

7. The kit of claim 5 wherein the side edges of each body are disposed at an acute angle with respect to the back surface of each body.

8. The kit of claim 5 wherein the mounting means comprises:

a resilient foam pad;

a permanent adhesive layer bonding the foam pad to the back surface of the body; and a releasable adhesive layer disposed on an opposite surface of the foam pad for releasably attaching the foam pad and the body to a surface.

9. The kit of claim 5 wherein:

the first group of bodies contains more bodies than the number of bodies in the second group; and the number of bodies in the second group is greater than the number of bodies in the third group.

10. The kit of claim 5 wherein:

the tip-to-tip dimension of each body in the first group of bodies is substantially less than the tip-to-tip dimension of each of the bodies in the second group of bodies; and the tip-to-tip dimension of each body in the second group of bodies is substantially less than the tip-to-tip dimension of each of the bodies in the third group of bodies.

11. The kit of claim 5 wherein:

the tip-to-tip dimension of each body in the second group of bodies is selected to be substantially 40% to 75% larger than the tip-to-tip dimension of each body in the first group of bodies; and the tip-to-tip dimension of each body in the third group of bodies is selected to be substantially 40% to 75% larger than the tip-to-tip dimension of each body in the second group of bodies.

12. The kit of claim 5 wherein:

each of the bodies is formed of a molded plastic material containing phosphorescent pigments;

the side edges of each body are disposed at an acute angle with respect to the back surface of each body;

the first group of bodies contains more bodies than the number of bodies in the second group;

the number of bodies in the second group is greater than the number of bodies in the third group;

the tip-to-tip dimension of each body in the first group of bodies is substantially less than the tip-to-tip dimension of each of the bodies in the second group of bodies; and the tip-to-tip dimension of each body in the second group of bodies is substantially less than the tip-to-tip dimension of each of the bodies in the third group of bodies.

13. The kit of claim 12 wherein the mounting means comprises:

a resilient foam pad;

a permanent adhesive layer bonding the foam pad to the back surface of the body; and a releasable adhesive layer disposed on an opposite surface of the foam pad for releasably attaching the foam pad and the body to a surface.

14. A kit for creating a simulated three-dimensional night sky on a substantially flat surface comprising:

at least first and second groups of star-shaped bodies, each having a plurality of radially extending tips, the bodies in the first and second groups being identical in shape, the bodies in the first group differing in size from the bodies in the second group;

the bodies in each of the first and second groups having front and back surfaces and interconnecting side edges;

each of the bodies being formed of a rigid plastic material having phosphorescent properties after exposure to light; and adhesive mounting means, mounted on the back surface of each body, for removably attaching each body to a surface, the adhesive mounting means covering a small portion of the surface area of each body.

15. The kit of claim 14 wherein:

the side edges of each body in the first and second groups are disposed at an acute angle with respect to the back surface of each body.

* * * * *